United States Patent
Ford et al.

(10) Patent No.: US 8,215,673 B2
(45) Date of Patent: Jul. 10, 2012

(54) PERCEIVED JACK POSITION DRIFT COMPENSATION METHOD AND APPARATUS

(75) Inventors: Robert Ford, Troy, MI (US); Shawn Haley, Lake Orion, MI (US); Mark Woloszyk, Sterling Heights, MI (US); John Manfreda, Sterling Heights, MI (US)

(73) Assignee: Innovative Design Solutions, Troy, MI (US)

(*) Notice: Subject to any disclaimer, the term of this patent is extended or adjusted under 35 U.S.C. 154(b) by 1180 days.

(21) Appl. No.: 12/020,725

(22) Filed: Jan. 28, 2008

(65) Prior Publication Data

US 2009/0189134 A1    Jul. 30, 2009

(51) Int. Cl.
  *B60S 9/02* (2006.01)
  *G05B 11/01* (2006.01)
(52) U.S. Cl. .......... 280/763.1; 280/6.153; 180/41; 701/36; 254/418
(58) Field of Classification Search .......... 280/763.1, 280/764.1, 765.1, 766.1, 6.153; 254/418, 254/419, 423, 425; 293/111.1; 701/36, 37, 701/38, 48; 180/41
  See application file for complete search history.

(56) References Cited

U.S. PATENT DOCUMENTS

| | | | |
|---|---|---|---|
| 3,606,247 A | 9/1971 | Liston | |
| 3,943,637 A | 3/1976 | Hanser | |
| 4,061,309 A | 12/1977 | Hanser | |
| 4,084,830 A | 4/1978 | Daniel, Jr. et al. | |
| 4,148,125 A | 4/1979 | Hanser | |
| 4,165,861 A | 8/1979 | Hanser | |
| 4,380,258 A | 4/1983 | Hanser | |
| 4,597,584 A | 7/1986 | Hanser | |
| 4,655,269 A | 4/1987 | Hanser et al. | |
| 4,743,037 A | 5/1988 | Hanser | |
| 4,746,133 A | 5/1988 | Hanser et al. | |
| 4,913,458 A * | 4/1990 | Hamilton | 280/6.153 |
| 5,143,386 A | 9/1992 | Uriarte | |
| 5,176,391 A | 1/1993 | Schneider et al. | |
| 5,188,379 A | 2/1993 | Krause et al. | |
| 5,511,459 A | 4/1996 | Hanser et al. | |
| 5,547,040 A | 8/1996 | Hanser et al. | |
| 5,628,521 A | 5/1997 | Schneider et al. | |
| 5,676,385 A | 10/1997 | Schneider et al. | |
| 5,713,600 A * | 2/1998 | Harlan et al. | 280/765.1 |
| 5,772,270 A | 6/1998 | Hanser et al. | |
| 5,890,721 A | 4/1999 | Schneider et al. | |
| 5,901,969 A | 5/1999 | Schneider et al. | |
| 5,908,215 A | 6/1999 | Hanser et al. | |
| 5,913,525 A | 6/1999 | Schneider et al. | |
| 6,050,573 A | 4/2000 | Kunz | |
| 2006/0226612 A1 * | 10/2006 | Smith et al. | 280/6.153 |
| 2007/0051933 A1 * | 3/2007 | Rincoe | 254/425 |
| 2010/0308291 A1 * | 12/2010 | Krones | 254/418 |

* cited by examiner

*Primary Examiner* — J. Allen Shriver, II
*Assistant Examiner* — Bridget Avery
(74) *Attorney, Agent, or Firm* — Reising Ethington P.C.

(57) ABSTRACT

A controller commands a jack drive to extend and retract a jack leg relative to a jack base along a stroke having retraction and extension limits. The controller updates a perceived present leg position value in response to position change signals from a position change sensor. The controller occasionally applies compensation factors to the perceived present leg position value in the extension direction. The controller resets the perceived present leg position value whenever the jack leg reaches the retraction limit.

15 Claims, 3 Drawing Sheets

PERCEIVED JACK POSITION DRIFT COMPENSATION METHOD AND APPARATUS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to an apparatus that compensates for drift in a perceived position of a jack leg.

2. Description of the Related Art Including Information Disclosed Under 37 CFR 1.97 and 1.98

Electro-mechanical jack systems are used in a wide variety of commercial and industrial applications. Because they generally comprise simple linear actuators, such jack systems can be integrated into mechanical systems for use in aligning or moving structures into desired positions relative to other structures or to applied forces or accelerations. One well known application of electro-mechanical jack technology is to control the attitude or tilt of a rigid or semi-rigid platform, such as a recreational vehicle, relative to earth's gravity.

Position sensing systems, such as optical encoders and Hall effect sensors are also known to be useful in many commercial and industrial applications. A typical optical encoder includes a rigid, opaque encoder ring that may be supported on a shaft or other structure whose rotation is to be monitored. The encoder ring may have angularly-spaced holes or slots that allow light to pass through. With a light source, such as an LED photoemitter, positioned on one side of the encoder ring, and a light detector, such as a phototransistor photodetector, positioned on the other side, a detection circuit connected to and receiving signals from the photodetector can sense whenever encoder ring rotation causes a hole/slot pass between the photoemitter and the photodetector. Because the holes/slots are spaced at regular angular intervals, rotation of the encoder ring will cause the photodetector to sense a continuous series of light pulses or pulse train as the shaft is spinning. By counting the pulses in a pulse train, the detection circuit can directly track the rotation of the encoder ring and shaft and can infer the motion of other connected structures. Additionally, the frequency/period of the pulse train can be used to calculate shaft rotational speed.

Hall effect sensors are typically mounted in fixed locations circumferentially spaced from one another and radially equidistant from a rotor magnet in positions allowing them to track rotor magnet rotation by sensing the passage of magnetic poles of the rotor magnet. Alternatively, a single Hall effect sensor may be mounted adjacent the circular path of an array of magnets circumferentially spaced around and supported on a rotatable disk or wheel. According to this arrangement the stationary Hall effect sensor tracks disk rotation by sensing the passage of the magnets.

When a position sensor such as an optical encoder or Hall effect sensor is employed, the position of a rotating structure such as a wheel or shaft can be accurately ascertained, and the position of a connected structure inferred, by counting pulses in the direction of rotation. An initial starting position of the rotating structure may be defined as being the pulse count of a pulse counter when the structure is in an initial starting or home position—typically or conventionally the pulse count at such a home position would be assigned a value of zero. Whenever a pulse is subsequently received it is then sensed whether rotation is clockwise or counter-clockwise. If clockwise, the pulse counter is conventionally incremented. If sensed rotation is counter-clockwise, the pulse counter is conventionally decremented.

Each pulse counted corresponds to a predetermined unit change in angular or rotational position of the shaft, as represented by the equation $$\text{ShaftRotation} = K_{ShaftRotationAnglePerPulse} \times \text{PulsesCounted}.$$

Where a jack includes a gearbox or other mechanical system that translates shaft rotation into linear extension/retraction of a leg portion of the jack, the position or degree of extension of the jack leg may be precisely calculated by the following equation:

$$\text{JackTranslation} = K_{TranslationPerrotation} \times \text{ShaftRotation}$$
$$\text{JackPosition} = \text{InitialStartingPosition} + \text{JackTranslation} = \text{InitialStartingPosition} + (K_{TranslationPerrotation} \times \text{ShaftRotation})$$

Accordingly, the total number of pulses counted is directly proportional to the distance the jack leg has traveled. The total number of pulses counted represents a position change or translation delta from a jack leg starting position that is unknown to the position sensor until the position sensor is "taught" what to consider as being the jack leg starting position.

The quality of sensor signals received from positions sensors such as Hall Effect sensors and optical position sensors can vary and is often not 100% accurate. For example, factors such as electrical noise, wear in mechanical elements of a drive system can periodically cause the loss of a pulse, or can cause additional pulses to be registered by a software counter. Each additional or missing pulse causes a small error in the calculated or "perceived" present position of a jack leg, i.e., the jack leg position perceived by a controller, resulting in a gradual drift of this perceived jack position away from the true or "actual" jack position. Although each missing or added pulse represents only a fraction of an inch of jack leg travel, over time, the errors will accumulate in either the extension or retraction direction and may eventually impair normal operation by, for example, reducing the controller's perception of the amount of jack stroke available.

Because such errors are generally random, they are impossible to predict and counter in a precise way. Consequently, drifting will occur. It would, therefore, be desirable for a jack or actuator system to be able to compensate for such errors and insure that, over time, the drift in perceived jack position is limited as much as is practical. It would also be desirable to automatically compensate for drift in perceived jack position without requiring user intervention.

It is also known for electro-mechanical actuators such as jacks to use software-defined soft stops. A soft stop is a position where a controller automatically stops the actuator, short of full extension or retraction to a stroke limit, to prevent the actuator from reaching such a stroke limit. Consistently stopping short of a stroke limit extends the life of an actuator by preventing the wear and tear that would otherwise result from repeated encounters with a hard physical stop defining a stroke limit.

It would be desirable to automatically limit the extent to which the perceived position of a leveling jack is allowed to drift in a direction that reduces the amount of stroke that a jack has available for leveling a platform or otherwise adjusting the position of an associated structure.

BRIEF SUMMARY OF THE DISCLOSURE

According to the invention an apparatus is provided for compensating for drift in a perceived position of a jack leg. The apparatus comprises a jack including a jack base and a jack leg supported for extension and retraction relative to the jack base along a stroke having retraction and second stroke limits. The jack also including a jack drive operably connected to the jack leg and configured to drive the jack leg along its stroke. A controller is connected to the jack drive and is configured to command the jack drive to extend and retract the jack leg. A position change sensor is connected to the controller and is positioned and configured to sense changes in jack leg position along the stroke and to provide corresponding jack leg position change signals to the controller. The controller is configured to track jack leg position by updating a perceived present leg position value in response to the position change signals. The controller is further configured to bias any leg position perception errors in a direction away from the retraction limit by occasionally applying a compensation factor to the perceived present leg position value, and to reset the perceived present leg position value whenever the jack leg reaches the retraction limit.

The controller may optionally be configured to track jack leg position relative to a perceived position of the retraction limit by updating a perceived present leg position value in response to the position change signals, halt jack leg retraction when, in response to the position change signals, the controller determines that the jack leg has reached a soft stop position short of the perceived retraction limit, progressively move the soft stop toward the retraction limit by applying the compensation factors downward and away from the retraction limit, and return the soft stop to a position short of the actual retraction limit when resetting the perceived present leg position value.

A method is also provided for compensating for drift in a perceived position of a jack leg. The method includes the steps of providing a jack including a jack base and a jack leg supported for motion relative to the jack base along a jack stroke that has retraction and extension limits, alternately extending and retracting the jack leg along the stroke, continuously updating a perceived present leg position value by sensing and tracking jack leg position as the jack leg is extending and retracting, biasing any leg position perception errors in the extension direction away from the retraction limit by occasionally applying a compensation factor to the perceived present leg position value in the extension direction, and resetting the perceived present leg position value whenever the jack leg reaches the actual retraction limit.

The method may optionally include the additional step of limiting jack leg retraction from proceeding beyond a soft stop position short of a perceived retraction limit. The resetting step may include resetting the perceived present leg position value whenever resultant soft stop movement toward the actual retraction limit has progressed so far as to allow the jack leg to reach the actual retraction limit.

According to this apparatus and method, by causing the perceived jack leg position to move progressively downward over successive jack extension and retraction cycles, accumulated perceived position errors are prevented from limiting available jack stroke as they otherwise might. By halting jack leg retraction at a soft stop, jack wear is reduced.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION

Figure 1:
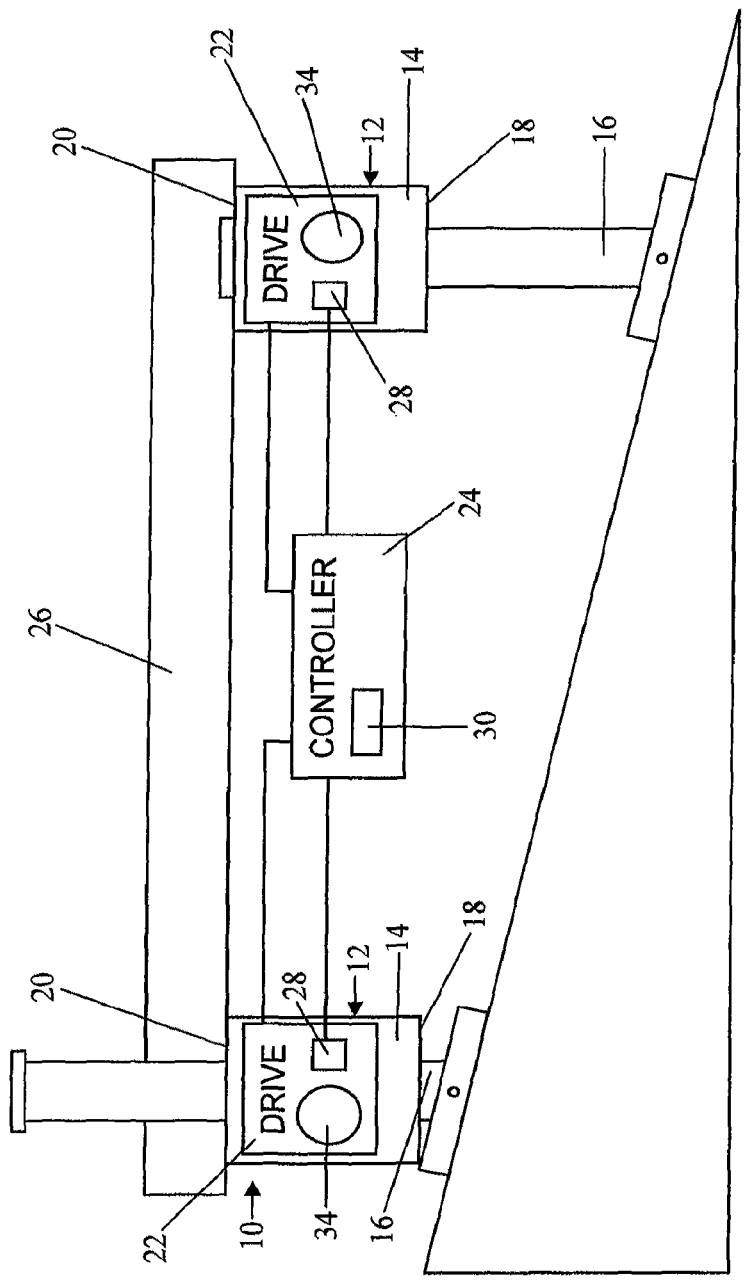
FIG. 1 is a schematic view of a leveling jack system including a perceived jack leg position drift compensator apparatus constructed according to the invention and showing two jacks supporting a platform in a level attitude over sloping ground.
Figure 2:
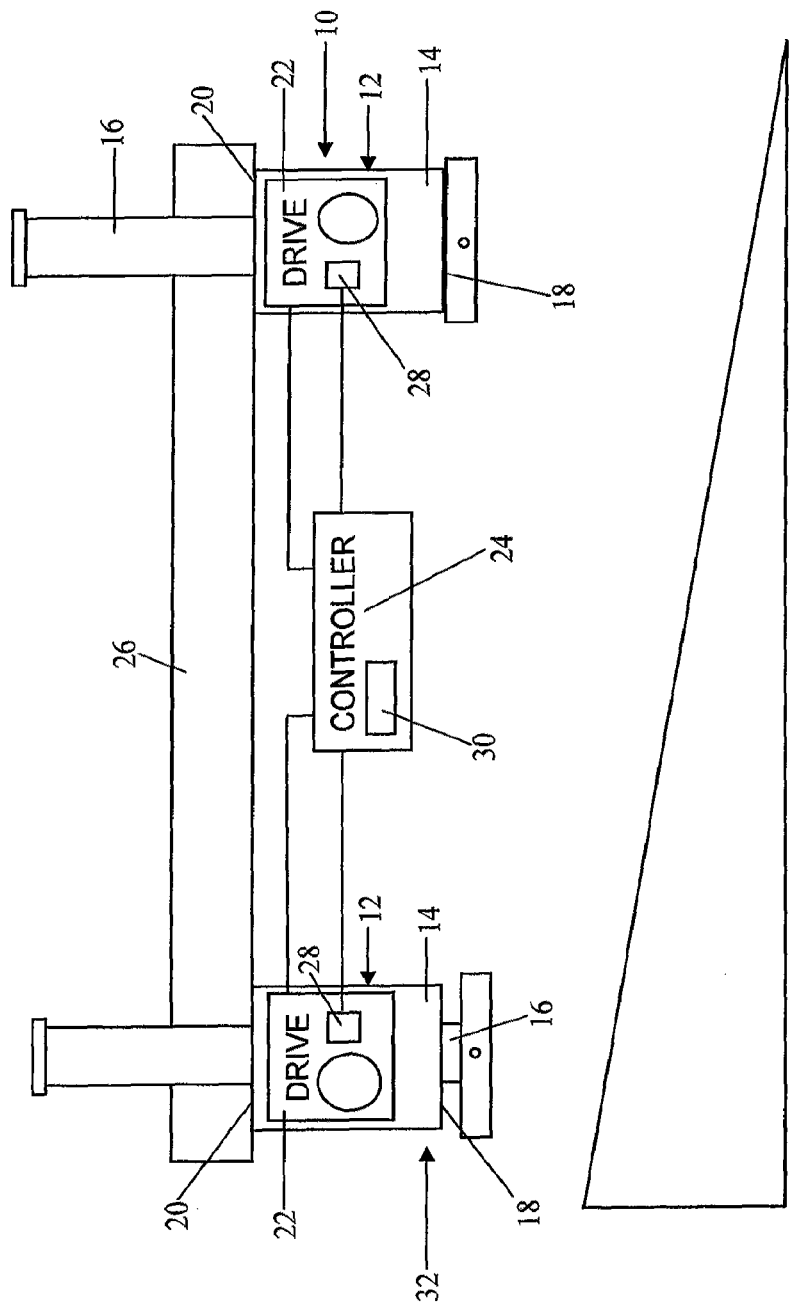
FIG. 2 is a schematic view of the leveling jack system of FIG. 1 showing one jack of the apparatus with its leg fully retracted to a retraction limit and a second leg retracted to a soft stop short of a retraction limit.

An apparatus for compensating for drift in the perceived position of a jack leg, i.e., a controller's perception of the position of the jack leg whether accurate or not, is generally shown at 10 in FIGS. 1 and 2. The apparatus 10 may include a jack 12 including a jack base 14 and a jack leg 16 supported for extension and retraction relative to the jack base 14 along a stroke having retraction and extension limits, or, upper and lower stroke limits, respectively. The upper and lower stroke limits are defined by respective physical stops as shown at 18 and 20 in FIG. 1. In FIG. 2 the jack 12 depicted on the right is shown with its leg 16 retracted to its retraction limit or upper stroke limit 18 and the jack 12 depicted on the right in FIG. 1 is shown with its leg 16 extended to its extension limit or lower stroke limit 20.

The jack 12 also includes a jack drive 22 operably connected to the jack leg 16. The jack drive 22 moves the jack leg 16 along the stroke. A controller 24 is connected to the jack drive 22 and may be programmed to adjust the attitude of a platform 26 supported on the jack 12 by commanding the jack drive 22 to extend and retract the jack leg 16 as necessary to achieve the desired attitude, e.g., a level attitude, of the supported platform 26. In other embodiments the controller 24 may be programmed to adjust the positions of any two objects or structures relative to one another by commanding the jack drive 22 to extend and retract the jack leg 16 as necessary to achieve the desired relative positioning between the objects or structures.

A position change sensor 28 may be connected to the controller 24 and positioned and constructed to sense changes in jack leg position along the stroke and to provide corresponding jack leg position change signals to the controller 24. The controller 24 may be programmed to track jack leg position relative to a software or perceived upper stroke limit by updating a software or perceived present leg position value in response to the position change signals. More specifically, the controller 24 may include a software counter 30 that is incremented when the controller 24 receives from the position change sensor signals indicating jack leg extension, and is decremented when the controller 24 receives signals indicating jack leg retraction.

The controller 24 may also be programmed to halt jack leg retraction when, in response to the position change signals, the controller 24 determines that the jack leg 16 has reached a soft stop position 32 a predetermined distance, e.g., a predetermined number of software counter increments or counts, short of the perceived upper stroke limit as represented schematically by the position of the jack leg 16 of the jack 12 depicted on the left in FIG. 2. By halting jack leg retraction at a soft stop 32 short of a hard stop 18, wear in the jack is reduced because the leg 16 is prevented from repeatedly being retracted against a hard physical stop 18. The physical stop defining the upper stroke limit 18 of the jack 12 could be located adjacent any moving component of the drive 22 or the jack leg 16 itself.

The controller 24 may be further programmed to bias any accumulating leg position perception errors in the extension direction and away from the upper stroke limit 18 by occasionally applying a compensation factor to the perceived present leg position value in the extension direction as shown in the table, below. This perception of incremental downward movement causes the controller 24 to correct leg position upward, moving the soft stop progressively closer to the true or actual upper stroke limit 18. In other words, the application of compensation factors in the extension direction results in soft stop movement in the retraction direction.

instead move progressively downward in the extension direction over many jack cycles. Progressive movement of the soft stop in the extension direction would move the soft stop progressively closer to the lower stroke limit 20, increasingly limiting the amount of stroke available to the jack 12 for use in, e.g., achieving a desired attitude for a supported platform 26.

The controller 24 may be programmed to add compensation factors that are each at least as great as a predetermined maximum expected leg position error value that would be expected to accrue between the addition of successive compensation factors. This insures that the addition of compensation factors will tend to move the perceived leg position in one direction only so that accumulated errors in the controller's perception of jack leg position will be biased toward the lower stroke limit 20 and away from the upper stroke limit 18. The controller 24 may be programmed to add each compensation factor to the perceived present leg position value in response to the occurrence of a certain event or the execution of a certain predetermined command such as, for example, whenever the controller 24 commands the jack leg 16 to extend.

The controller 24 may be programmed to learn or re-learn the position of the actual upper stroke limit 18 upon detecting the arrival of the jack leg 16 at the actual upper stroke limit 18.

| Event | Jack leg position (perceived/software) | Jack leg position (true/actual) | Comment |
|---|---|---|---|
| Jack leg at soft stop | X | X | System synchronized |
| Extend jack leg Y counts | X + Y | $X + Y + \Delta_{err}$ | Position perception error due, e.g., to missing pulses. Controller perception of jack position lags actual jack position. Jack system slightly out of sync |
| Compensate | $X + Y + \Delta_{compensation}$ | $X + Y + \Delta_{err}$ | Controller perceives jack leg as having extended too far because $X + Y + \Delta_{compensation} > X + Y + \Delta_{err}$ |
| Retract jack leg to soft stop | X | $X + \Delta_{err} - \Delta_{compensation}$ | Controller overcompensates by causing jack to retract too far. Jack will eventually hit actual stroke limit enroute to perceived soft stop position. |

The controller 24 is further programmed to return the soft stop downward to a position short of the actual upper stroke limit 18 by resetting the perceived present leg position value whenever the jack leg 16, during retraction, reaches the actual upper stroke limit 18 en route to the soft stop. The controller 24 may be programmed, upon reaching the actual upper stroke limit 18, to reset the present leg position value by setting the software counter value to zero.

The jack leg 16 will reach the actual upper stroke limit 18 after the cumulative addition of compensation factors has changed the controller's perception of the position of the soft stop to a position that is now at or above the true or actual position of the upper stroke limit 18. Once the controller's perception of the position of the soft stop has drifted this far, the next time that the controller 24 commands the jack leg 16 to retract to the soft stop, the leg will reach the actual upper stroke limit 18 either before or at the same time as the leg reaches the soft stop. By causing the controller's perception of soft stop position to drift in the retraction direction, accumulated errors are prevented from causing the soft stop to Where the jack drive 22 includes an electric drive motor 34 drivingly connected to the jack leg 16 to drive the jack leg 16 along its stroke, the controller 24 may be programmed to correct the controller's perception of the position of the upper stroke limit 18 when retracting the jack leg 16, i.e., moving the jack leg 16 toward the upper stroke limit 18, and detecting phenomena associated with the operation of an electric jack 12 when the leg is at or approaching a stroke limit. For example, the controller 24 may be programmed to correct its perception in the position of true or actual upper stroke limit 18 when retracting the jack leg 16 and detecting jack motor stall, mechanical tightening in the jack 12, clutching in a clutch connected between the jack motor 34 and the jack leg 16, or jack motor power draw values known to be associated with the operation of an electric jack when its leg is at or approaching a jack stroke limit. Additional information regarding these detection methods are disclosed in U.S. Ser. No. 11/223,689 published as US-2006-0081420-A1 on Apr. 20, 2006 and incorporated herein by reference in its entirety, or any other suitable jack stroke limit detection methods as may be known in the art.

The position change sensor 28 may be positioned in a gear box 36 of the jack drive 22 that is operably connected between the jack motor 34 and the jack leg 16. However, the position change sensor 28 may be positioned in any location where it will be able to sense mechanical changes corresponding to the degree of extension or retraction of the jack leg 16. For example, the sensor 28 may be supported in a position within the gear box 36 and adjacent a gear or shaft 38 that rotates at a rate proportional to the movement of the jack leg 16. Any suitable position change sensor system may be used, such as a Hall Effect sensor or an optical sensor, such as are disclosed in U.S. Ser. No. 11/223,689, which is incorporated herein by reference.

In practice, a jack drive 22 may first be operably connected to a jack leg 16 and commanded by the controller 24 to alternately extend and retract the jack leg 16 along the stroke. Where the jack drive 22 includes an electric jack motor 34 drivingly connected to the jack leg 16, the controller 24 causes the jack leg 16 to extend and retract by commanding the jack motor 34 to so move the jack leg 16.

Figure 3:
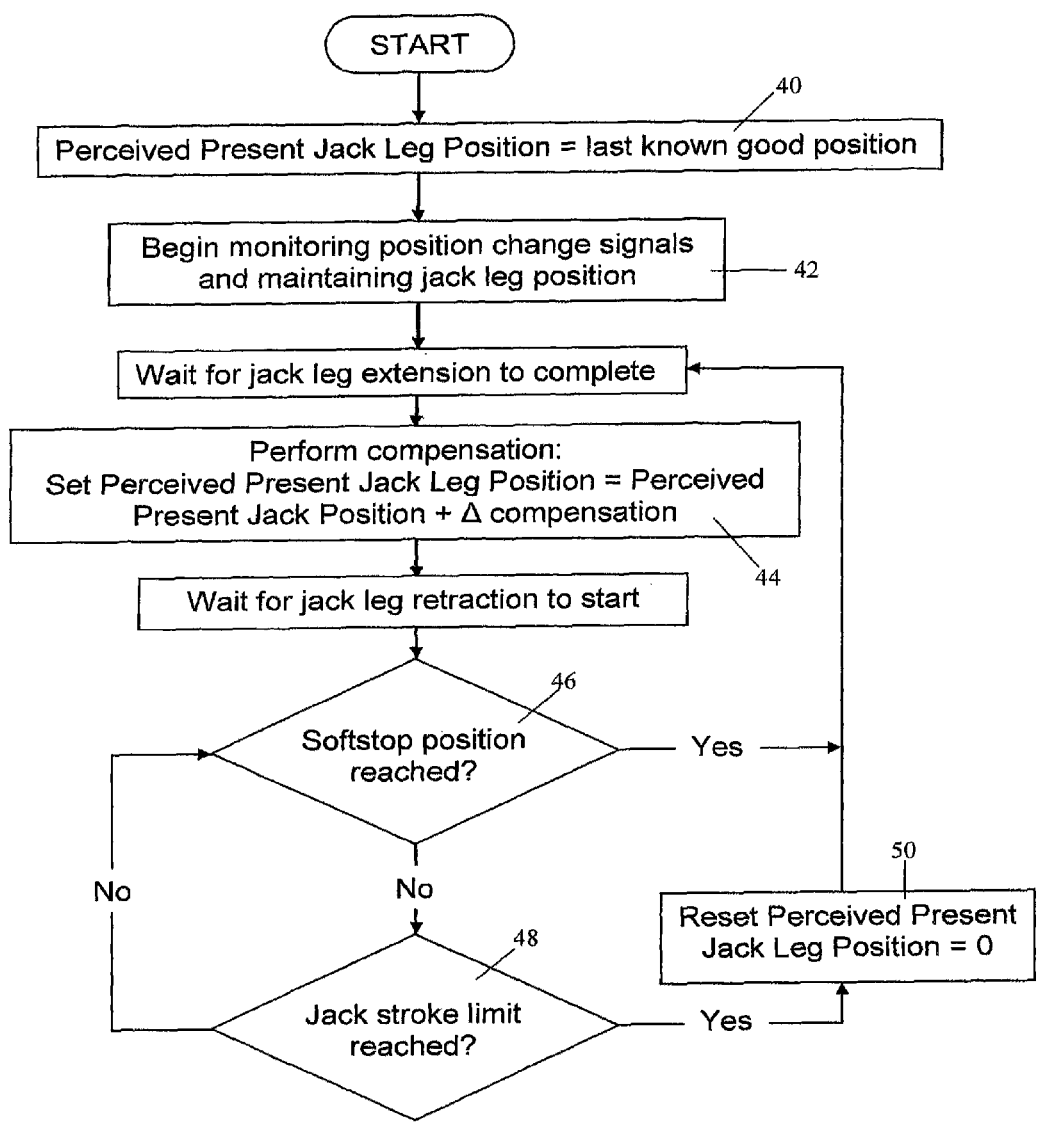
FIG. 3 is a flow chart depicting a logical process that may be used to bias perceived position errors in the direction of jack leg extension in the leveling jack system of FIGS. 1 and 2 by adding a compensation factor with each jack leg extension command and that may further be used to limit jack leg retraction to a soft stop and to reset perceived jack leg position when accumulated compensation factors cause the jack leg to be retracted to the actual retraction limit or home position of the jack leg.

As shown at action step 40 in FIG. 3, the perceived present leg position value, i.e., the present leg position value perceived by the controller 24, may initially be set to whatever the last known good position value happens to be when jack leg extension begins, e.g., the perceived leg position when the leg was last at the upper stroke limit. The present leg position value may then be continuously updated, as shown at action step 42, by sensing and tracking jack leg position as the jack leg 16 is extending and retracting. The sensing and tracking may be accomplished by providing the position change sensor 28 in a position to track changes in jack leg position along the stroke. The perceived present leg position value may be continuously updated in response to position change signals received from the position change sensor 28 as is, again, shown in action step 42.

As shown in action step 44 and decision step 46, jack leg retraction may be limited from proceeding beyond a soft stop position 32 short of the perceived upper stroke limit by biasing any accumulating leg position perception errors in an extension direction away from the upper stroke limit 18. This may be done by occasionally applying a compensation factor to the perceived present leg position value in the extension direction. Compensation factors may be added that are at least as great as a predetermined maximum expected position error value known to be accruable between the additions of each compensation factor. Each compensation factor may be added to the perceived present leg position value in the direction of jack leg extension whenever the jack leg 16 is commanded to extend.

As shown in decision step 48 and action step 50, the perceived present leg position value is then reset whenever the resultant soft stop movement toward the actual upper stroke limit 18 has progressed so far as to allow the jack leg 16 to reach the actual upper stroke limit 18. The perceived present leg position value may be reset to zero at that point by, for example, resetting the value of a software counter 30 to zero counts. This may be done whenever the jack leg 16 reaches the upper stroke limit 18 without first being halted at the soft stop position 32, i.e., after the addition of correction factors has caused the soft stop position 32 to move to or above the actual position of the upper stroke limit 18.

Causing the perceived jack leg position to move progressively downward over successive jack extension and retraction cycles prevents accumulated perceived position errors from limiting available jack stroke. Halting jack leg retraction at a soft stop short of a hard stop reduces jack wear, particularly in the jack drive.

This description, rather than describing limitations of an invention, only illustrates an embodiment of the invention recited in the claims. The language of this description is therefore exclusively descriptive and is non-limiting.

Obviously, it is possible to modify this invention from what the invention teaches. Within the scope of the claims, one may practice the invention other than as described above.

What is claimed is:

1. An apparatus for compensating for drift in a perceived position of a jack leg, the apparatus comprising:
    a jack including a jack base and a jack leg supported for extension and retraction relative to the jack base along a stroke having retraction and extension limits, the jack also including a jack drive operably connected to the jack leg and configured to drive the jack leg along its stroke;
    a controller connected to the jack drive and configured to command the jack drive to extend and retract the jack leg, and
    a position change sensor connected to the controller and positioned and configured to sense changes in jack leg position along the stroke and to provide corresponding jack leg position change signals to the controller, the controller being configured to track jack leg position by updating a perceived present leg position value in response to the position change signals;
    the controller being further configured to bias any leg position perception errors in a direction away from the retraction limit by occasionally applying a compensation factor to the perceived present leg position value, and to reset the perceived present leg position value whenever the jack leg reaches the retraction limit.

2. An apparatus as defined in claim 1 in which the controller is configured to add a compensation factor that is at least as great as a predetermined maximum expected leg position perception error value.

3. An apparatus as defined in claim 1 in which the position change sensor is positioned and is configured to sense changes in the position of a drive gear that rotates at a rate proportional to the movement of the jack leg.

4. An apparatus for compensating for drift in a perceived position of a jack leg, the apparatus comprising:
    a jack including a jack base and a jack leg supported for extension and retraction relative to the jack base along a stroke having retraction and extension limits, the jack also including a jack drive operably connected to the jack leg and configured to drive the jack leg along its stroke;
    a controller connected to the jack drive and configured to command the jack drive to extend and retract the jack leg, and
    a position change sensor connected to the controller and positioned and configured to sense changes in jack leg position along the stroke and to provide corresponding jack leg position change signals to the controller, the controller being configured to track jack leg position by updating a perceived present leg position value in response to the position change signals;
    the controller being further configured to:
        bias any leg position perception errors in a direction away from the retraction limit by occasionally applying a compensation factor to the perceived present leg position value, and to reset the perceived present leg position value whenever the jack leg reaches the retraction limit;

track jack leg position relative to a perceived position of the retraction limit by updating a perceived present leg position value in response to the position change signals;

halt jack leg retraction when, in response to the position change signals, the controller determines that the jack leg has reached a soft stop position short of the perceived retraction limit;

progressively move the soft stop toward the retraction limit by applying the compensation factors downward and away from the retraction limit; and return the soft stop to a position short of the actual retraction limit when resetting the perceived present leg position value.

5. An apparatus for compensating for drift in a perceived position of a jack leg, the apparatus comprising:

a jack including a jack base and a jack leg supported for extension and retraction relative to the jack base along a stroke having retraction and extension limits, the jack also including a jack drive operably connected to the jack leg and configured to drive the jack leg along its stroke;

a controller connected to the jack drive and configured to command the jack drive to extend and retract the jack leg, and a position change sensor connected to the controller and positioned and configured to sense changes in jack leg position along the stroke and to provide corresponding jack leg position change signals to the controller, the controller being configured to track jack leg position by updating a perceived present leg position value in response to the position change signals;

the controller being further configured to:

bias any leg position perception errors in a direction away from the retraction limit by occasionally applying a compensation factor to the perceived present leg position value, reset the perceived present leg position value whenever the jack leg reaches the retraction limit; and add a compensation factor to the perceived present leg position value whenever the controller commands the jack leg to extend.

6. An apparatus as defined in claim 5 in which the controller is configured to learn the position of the actual retraction limit by detecting the arrival of the jack leg at the actual retraction limit.

7. An apparatus as defined in claim 6 in which:

the jack drive includes an electric jack motor drivingly connected to the jack leg and configured to drive the jack leg along its stroke; and the controller is configured to correct its perception of the position of the retraction limit when retracting the jack leg and detecting any one or more phenomena selected from the group consisting of: jack motor stall, mechanical tightening in the jack, clutching in a clutch connected between the jack motor and the jack leg, and jack motor power draw values known to be associated with the operation of an electric jack when its leg is at or approaching a jack stroke limit.

8. A method for compensating for drift in a perceived position of a jack leg, the method including the steps of:

providing a jack including a jack base and a jack leg supported for motion relative to the jack base along a jack stroke that has retraction and extension limits;

alternately extending and retracting the jack leg along the stroke;

continuously updating a perceived present leg position value by sensing and tracking jack leg position as the jack leg is extending and retracting;

biasing any leg position perception errors in the extension direction away from the retraction limit by occasionally applying a compensation factor to the perceived present leg position value in the extension direction; and resetting the perceived present leg position value whenever the jack leg reaches the actual retraction limit.

9. A method for compensating for drift in a perceived position of a jack leg, the method including the steps of:

providing a jack including a jack base and a jack leg supported for motion relative to the jack base along a jack stroke that has retraction and extension limits;

alternately extending and retracting the jack leg along the stroke;

continuously updating a perceived present leg position value by sensing and tracking jack leg position as the jack leg is extending and retracting;

biasing any leg position perception errors in the extension direction away from the retraction limit by occasionally applying a compensation factor to the perceived present leg position value in the extension direction;

resetting the perceived present leg position value whenever the jack leg reaches the actual retraction limit; and limiting jack leg retraction from proceeding beyond a soft stop position short of a perceived retraction limit and in which the resetting step includes resetting the perceived present leg position value whenever resultant soft stop movement toward the actual retraction limit has progressed so far as to allow the jack leg to reach the actual retraction limit.

10. The method of claim 9 in which the step of alternately extending and retracting the jack leg includes:

providing a jack drive operably connected to the jack leg and configured to drive the jack leg along the stroke; and causing the jack drive to alternately extend and retract the jack leg along the stroke.

11. The method of claim 9 in which:

the step of sensing and tracking jack leg position includes providing a position change sensor positioned and configured to track changes in jack leg position along the stroke; and the step of continuously updating a perceived present leg position value includes updating that value in response to position change signals received from the position change sensor.

12. The method of claim 9 in which the addition of compensation factors includes adding compensation factors that are each at least as great as a predetermined maximum expected position error value.

13. The method of claim 9 in which each compensation factor is added to the perceived present leg position value in the direction of jack leg extension whenever the jack leg is commanded to extend.

14. The method of claim 9 in which the step of resetting the perceived present leg position value includes resetting that value whenever the jack leg reaches the actual retraction limit.

15. The method of claim 10 in which:

the step of providing a jack drive includes providing an electric jack motor drivingly connected to the jack leg;

the step of alternately extending and retracting includes commanding the jack motor to alternately extend and retract the jack leg; and the method includes the additional step of correcting the perceived position of the retraction stroke limit when retracting the jack leg and detecting any one or more phenomena selected from the group consisting of: jack motor stall, mechanical tightening in the jack, clutching in a clutch connected between the jack motor and the jack leg, and jack motor power draw values known to be associated with the operation of an electric jack when its leg is at or approaching a jack stroke limit.

* * * * *